US007779053B2

(12) United States Patent
Beck et al.

(10) Patent No.: US 7,779,053 B2
(45) Date of Patent: Aug. 17, 2010

(54) DIAGNOSIS OF AN AUTOMATION SYSTEM

(75) Inventors: Hans-Joachim Beck, Rheinstetten (DE);
Norbert Becker, Erlangen (DE); Dieter Helmig, Nürnberg (DE); Josef Ritzer, Karlsruhe (DE); Michael Schlemper, Erlangen (DE); Axel Schmuck, Karlsruhe (DE); Stefan Weigel, Röckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 11/375,988

(22) Filed: Mar. 15, 2006

(65) Prior Publication Data
US 2006/0212268 A1   Sep. 21, 2006

(30) Foreign Application Priority Data
Mar. 17, 2005   (EP)   ................................. 05005903

(51) Int. Cl.
G06F 7/00 (2006.01)
G06F 17/30 (2006.01)
G01B 5/28 (2006.01)
G01B 5/30 (2006.01)

(52) U.S. Cl. ........................................ 707/812; 702/35
(58) Field of Classification Search ....................... None
See application file for complete search history.

(56) References Cited

U.S. PATENT DOCUMENTS 5,193,178 A * 3/1993 Chillarege et al. ............. 714/25
5,253,359 A * 10/1993 Spix et al. ..................... 714/46
5,528,752 A    6/1996 Kise et al.
5,914,875 A    6/1999 Monta et al.
6,484,134 B1 * 11/2002 Hoskote ....................... 703/14
6,789,054 B1 *  9/2004 Makhlouf ...................... 703/6
6,813,587 B2 * 11/2004 McIntyre et al. ............. 702/183
7,136,793 B2 * 11/2006 Simkins ......................... 703/6
7,409,317 B2 *  8/2008 Cousin et al. ................ 702/183
2002/0111755 A1 *  8/2002 Valadarsky et al. ........... 702/58
2002/0157035 A1 * 10/2002 Wong et al. ..................... 714/4
2002/0170002 A1 * 11/2002 Steinberg et al. .............. 714/39

FOREIGN PATENT DOCUMENTS
EP   0 413 512 A2   2/1991
EP   0 842 523 B1   5/1998

OTHER PUBLICATIONS

Media and Topologies part 1, HTML, Feb. 7, 2002, studynotes.net, http://web.archive.org/web/20020207141729/http://studynotes.net/net1.htm (Accessed: May 5, 2009).*

* cited by examiner

Primary Examiner—Pierre M Vital
Assistant Examiner—Jason Liao

(57) ABSTRACT

The invention relates to a method, a computer program product and an engineering system for creating a diagnostic model of an automation system made up of various automation components. The diagnostic model is generated automatically during the project planning phase of the automation system. Within the diagnostic model the automation components are represented by model nodes. Functional and/or physical relationships between the automation components are mapped by links between the corresponding model nodes within the diagnostic model. Each model node contains status information in which the status of the associated automation component is stored. By evaluating the status information, the status of the automation system can be investigated and monitored with the aid of the diagnostic model.

18 Claims, 3 Drawing Sheets

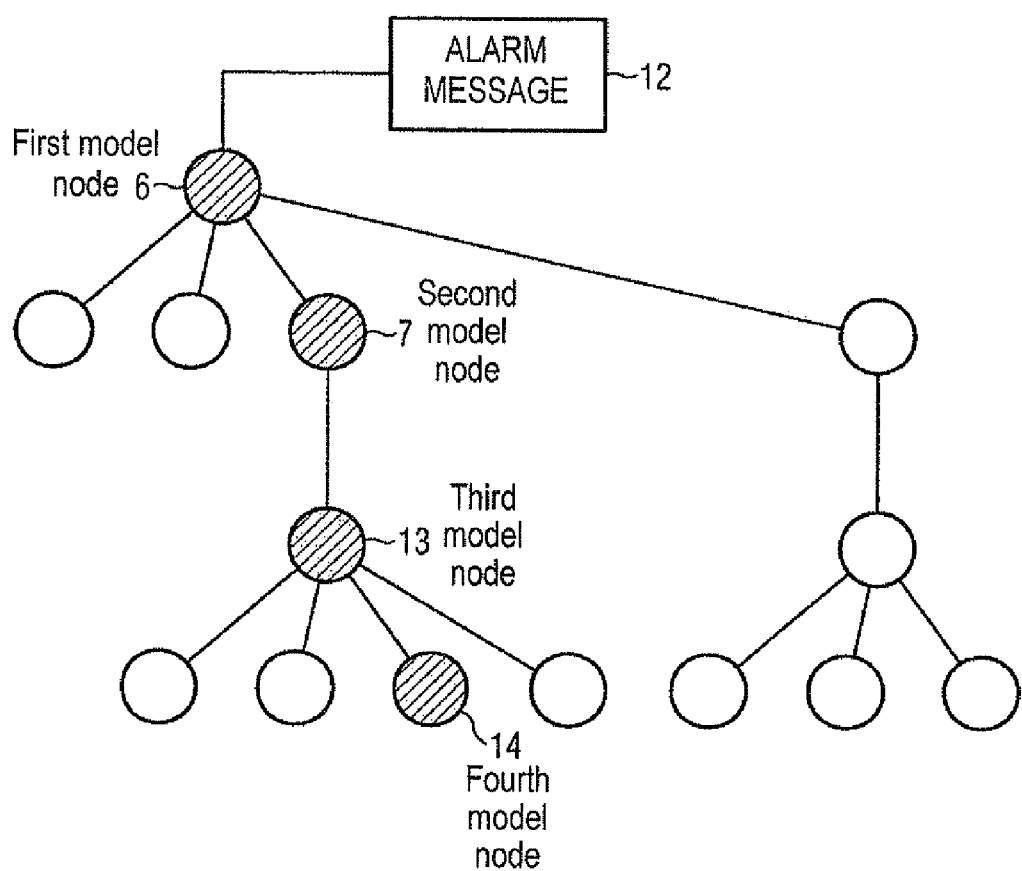

DIAGNOSIS OF AN AUTOMATION SYSTEM

CROSS REFERENCE TO RELATED APPLICATIONS

This application claims priority to the European Application No. EP05005903.9, filed Mar. 17, 2005 which is incorporated by reference herein in its entirety.

FIELD OF INVENTION

The invention relates to a method, a computer program product and a system for diagnosis of an automation system made up of automation components.

BACKGROUND OF INVENTION

The operation and monitoring of automated production devices requires that status information of the automation devices and the production is always up-to-date and that there is a fast reaction to changes. For this all events and errors from the automation devices and the processes must be recorded, evaluated, communicated and signaled. The type of recording and evaluation, reactions to events to be initiated and the selection of the target devices on which the events or results and their processing is to be shown or stored must already be defined in the engineering phase.

SUMMARY OF INVENTION

Known methods and applications for system and process diagnosis are based on specific methods and/or specific tools with which a project planner of an automation device can meet specific diagnostic requirements through additive engineering steps. To record, edit and further process the diagnostic events specific engineering steps are performed and/or additional programs created.

An underlying object of the invention is to make available diagnosis information for an automation system with the least possible engineering effort.

This object is achieved by a diagnostic method for an automation system consisting of at least one first and one second automation component, in which the automation components in are in a physical and/or functional relationship to each other, with the following steps:

Creation of a diagnostic model in which the first automation component is assigned to a first model node and the second automation component to a second model node, Creation of a link between the first and second model nodes within the diagnostic model which models the physical and/or functional relationship between the first and second automation component, Creation of a first status of the first automation component in first status information of the first model node and of a second status of the second automation component in second status information of the second model node in the diagnostic model and Evaluation of the first and/or second status information to determine status information for the automation system, with the diagnostic model being created automatically for project planning of the engineering system carried out with an engineering system.

Furthermore the object is achieved by a computer program product for performing said method.

Furthermore the object is achieved by an engineering system for project planning an automation system with an input device for definition of a physical and/or functional relationship between a first and a second automation component and a first processing unit for:

Automatic creation of a diagnostic model during project planning, in which the first automation component is assigned to a first model node and the second automation component to a second model node, Automatic creation of a link between the first and second model node within the diagnosis model which models the physical and/or functional relationship between the first and second automation component, with the diagnostic model being provided for Recording a first status of the first automation component in a first item of status information of the first model node and a second status of the second automation component in a second item of status information of the second model node in the diagnosis model and for Evaluation of the first and/or second items of status information to determine status information for the automation system.

For the project planning of an automation application a project planner generates an automation system from various automation components. The automation components can be both hardware and also software components. The individual components of the automation system have a functional and/or physical relationship to each other. The individual automation components as well as the logical linkage of the automation components into an overall system are generally selected by a user with the aid of an engineering system.

The invention is based on the knowledge that the diagnostic model which reflects the topology of the automation system produced can be generated automatically in the engineering phase. In project planning with the aid of an engineering system the user selects the individual components of the automation system from libraries, and puts these in relation to each other in accordance with the application requirement. Each component in this case has an electronic description, which, in addition to performance data such as manufacturer specifications, function quantity framework or device parameters, can also especially include a description of the events which can record, generate and communicate these components. Under some circumstances this is also taken to mean a list of the possible errors which this component knows or can cause. The topology of the automation system thus generated can be automatically converted into a corresponding diagnostic model. Within the diagnostic model the individual automation components will be represented by model nodes. Links are created between the model nodes which reflect the logical, physical or functional relationships between the corresponding automation components.

Each model node is assigned status information describing the status of the associated automation component. On the basis of the status information of the model node, status information can finally be generated which provides information about the overall status of the automation system.

The method in accordance with the invention automatically generates a diagnostic model as early as the project planning stage which reflects the topological shape of the automation system. The model nodes of the diagnostic model correspond to the automation components of the automation systems and the links between the model node to the physical, functional or logical relationships of the individual automation components. Thus the method in accordance with the invention, without additional engineering effort, creates a topological view of the overall automation system, on the basis of which a diagnosis of the overall system can be performed very simply. Information relating to the individual components and their application-specific links to each other already used at the project planning stage of the automation system is converted directly into an application-specific diagnostic model, without the user having to perform additional engineering steps to do this.

Faulty components can be very easily selected within the overall automation system. Additional services, such as search functions, filters or error statistics for example can be implemented very easily using the diagnostic model. Errors detected can be used to generate the corresponding alarm messages. Furthermore, on the basis of the diagnostic model, users can interrogate the current overall status of the diagnostic model or have it displayed to them.

In an advantageous embodiment of the invention the first and/or second model node include an electronic description of the associated automation component, with the electronic description especially comprising a description of possible errors of the associated automation component. These types of electronic descriptions are as a rule already present in an engineering system which a user uses for project planning of the automation system.

The diagnostic model advantageously reflects the structure of the automation system in a one-to-one way. Within the automation system the individual automation components are often placed in a hierarchical order to each other. For example a bus master controls a number of I/O modules, so that the bus master is arranged in the hierarchical order above the I/O modules. Such an arrangement can also be found in the diagnostic model. The hierarchical order between the automation components is modeled in this case via the link between the corresponding model nodes. This also produces a hierarchical order between the different model nodes of the diagnostic model. In this case it can be advantageous for the second status information to be able to be read in via the link from the first model node. In such a case the first model node is above the second model node with the second status information in the hierarchy. The first model node checks by reading in the second status information the status of the second model node or of the second automation component assigned to the second model node.

Especially with this type of hierarchical arrangement between the first and the second model node it is advantageous for a filter function to be implemented within the first model node, with an alarm message being generated depending on the first and/or second status information. Since the first model node is above the second node in the hierarchy, it checks both its own status information and also the second status information of the second model node and decides whether one of these items of status information is a reason for generation of an alarm message. The first model node uses the filter function for this purpose.

In an advantageous embodiment of the invention the diagnostic model can be used to determine a faulty component within the automation system. This can be done especially simply by using the first status information to display a fault, if the second status information shows a fault, provided the first automation component is functionally superior to the second automation component. This type of functional order would be produced for example with a master-slave relationship or where an I/O module is activated by a CPU. In this case it is useful for the first status information to also display a fault if the second automation component has a fault but the first automation component itself is operating correctly. On an alarm message the first status information is then usefully checked to find the cause of the fault and only in the case of a fault display of the first status information is the second status information checked.

In an advantageous embodiment of the diagnostic method the diagnostic model is loaded onto the first and/or the second automation component and activated at run time of the automation system. Advantageously an "intelligent" automation component such as a CPU for example will be used to activate the diagnostic model.

BRIEF DESCRIPTION OF THE DRAWINGS

The invention is described and explained in more detail below on the basis of the exemplary embodiments shown in the Figures. The figures show.

DETAILED DESCRIPTION OF INVENTION

Figure 1:
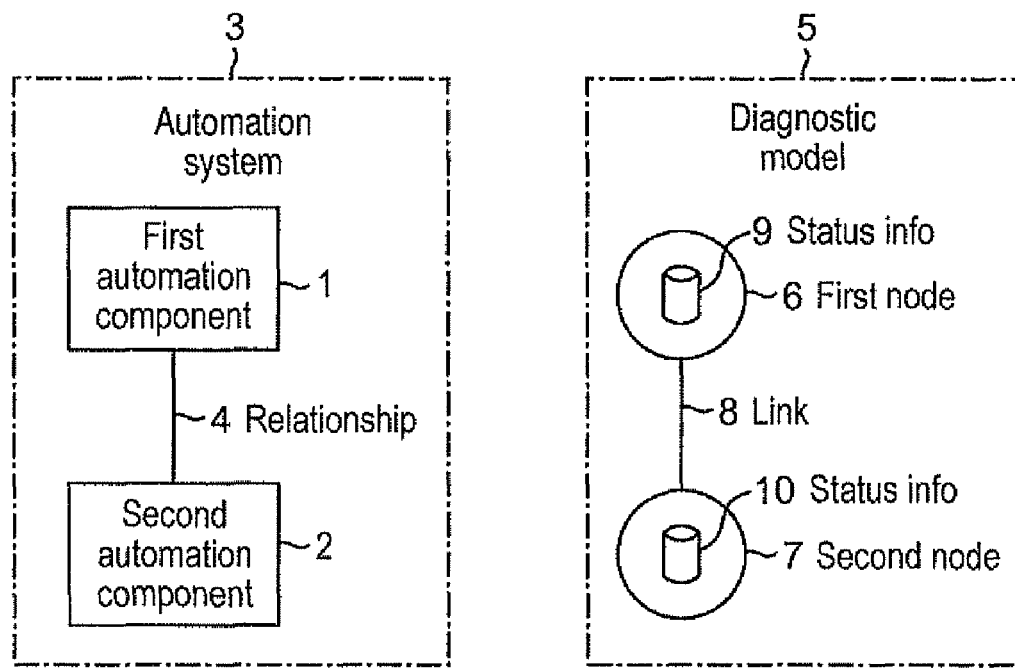
FIG. 1 a schematic diagram of an automation system made up of a first and a second automation component and of an associated diagnostic model, FIG. 2 a schematic diagram of an engineering system for project planning of an automation system and generation of an associated diagnostic model and FIG. 3 an indication within a diagnostic model of a fault caused by an automation component.

FIG. 1 shows a schematic diagram of an automation system 3 and an associated diagnostic model 5 made up of a first and a second automation component 1,2. Within the automation system 3 the automation components 1,2 are in a physical and/or functional relationship 4 to each other. For example the second automation component 2 is an I/O module which is activated by the first automation component 1 which is embodied for example as a CPU.

For project planning of the automation system 3 a user of an engineering system selects from a library the CPU 1 and the I/O module 2 and creates the physical or functional relationship between these two components 4. In this project planning method the diagnostic model 5 is created automatically by the CPU 1 being represented by a first model node 6 and the I/O module 2 by a second model node 7. The diagnostic model 5 contains electronic descriptions which are assigned to the first and second automation components 1,2. In addition each model node 6,7 is assigned status information 9,10. The first model node 6 contains first status information 9 which includes information about the current status of the first automation component 1. The second status information 2 of the second model node 7 contains information about the status of the second automation component 2. The physical or functional relationship between the first and the second automation component 1,2 is modeled in the diagnostic model 5 by a link 8.

The diagnostic model 5 produced can subsequently be loaded for example onto the first or the second automation component 1,2 and executed at run time. Since the second automation component is an I/O module which as a rule does not have any intelligence for executing this type of diagnostic method, the obvious choice for the case shown here is to load the diagnostic model on the first automation component 1 embodied as a CPU and to execute it there at run time. If a fault in I/O module 2 now occurs at run time, the second status information 10 is used in the diagnostic model 5 to display this fault. This fault can for example be read out within the diagnostic model 5 from the first model node 6. Depending on the significance of the fault the first status information 9 can finally also be used within the first model node 6 to display a fault. Furthermore first model node 6 can be used for generation of an alarm message which signals a faulty state of the automation system 3.

Figure 2:
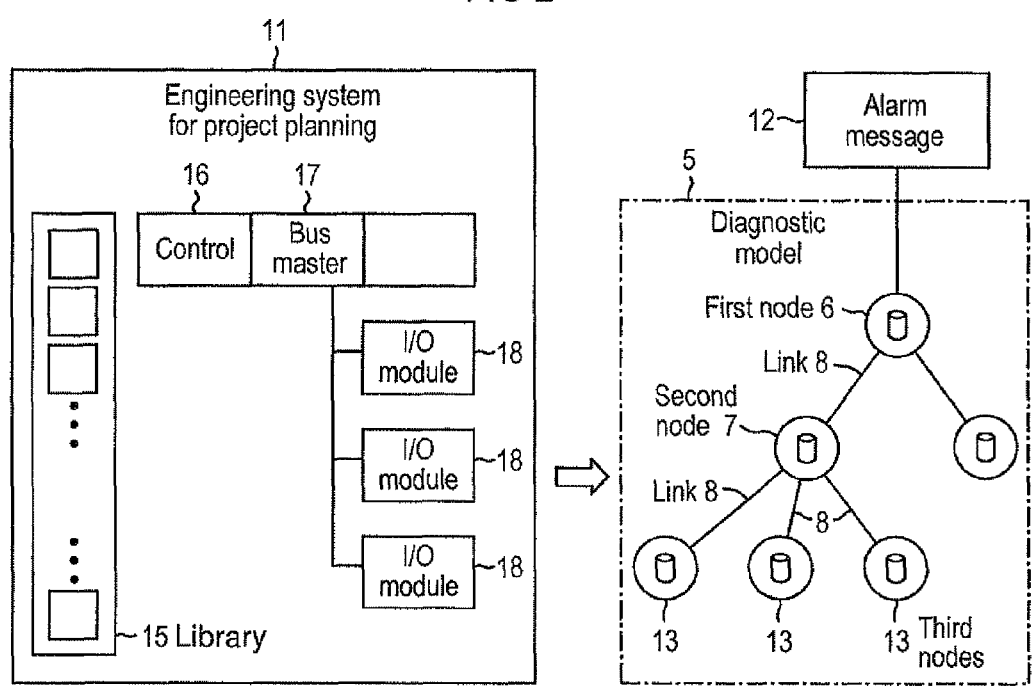

FIG. 2 shows a schematic diagram of an engineering system 11 for project planning of an automation system and generation of an associated diagnostic model. Within the engineering system 11 a user has the opportunity of selecting different components of an automation system from a library 15 and of relating them to each other on a graphical user interface. For example the user selects from the library 15 a control 16 and a bus master 17, via which three I/O modules 18 are activated.

During the project planning shown with the aid of the engineering system 11 a diagnostic model 5 of the planned automation system is automatically generated in which the selected automation components are represented by corresponding model nodes. Thus the control 16 is modeled by a first model node 6 and the bus master 17 by a second model node 7. The I/O module 18 is represented by three third model nodes 13 which are arranged to be subordinate within the diagnostic model to the second model node 7 in a hierarchical tree structure. Thus the diagnostic model 5 contains links 8 which reflect the physical or functional relationships of the automation components within the planned automation system in the form of a tree structure.

The diagnostic model 5 can be loaded after the project planning phase onto one or more components of the automation system and can be executed there at run time.

Since the diagnostic model 5 almost completely models the topological structure of the automation system, it can be employed very advantageously for finding a faulty component within the automation system.

FIG. 3 shows an indication of a fault caused by an automation component within a diagnostic model. The Figure illustrates the extent to which the topological view of the diagnostic model can be used to employ a fault caused by an automation component explicitly for generation of an alarm message 12 and to trace the faulty component within the overall system. The system has a plurality of model nodes which represent corresponding automation components and of which, to give a better overview, only a first model node 6, a second model node 7, a third model node 13 and a fourth model node 14 are indicated. For example the first model node 6 is intended to represent a CPU which activates a bus master which is modeled by the second model node 7. The bus master is in its turn connected to a second CPU which is modeled by the third model node 13 and is configured as a slave. The second CPU in its turn activates different I/O modules, of which one is modeled by the fourth model node 14.

It is now assumed to be the case that the I/O module which is represented by the fourth model node 14 has a fault. Such a fault is indicated with the aid of corresponding status information, which is a component of the fourth model node 14. With a fault which could cause problems within the overall system, status information assigned to the third model node 13 would now indicate an error. This error is finally also detected and displayed by the second model node 7, which is higher up in the hierarchy than the third model node 13. Finally the status information of the first model node 6 will also show an error which, depending on the severity of the error gives rise to the generation of an alarm message 12. The alarm message 12 is for example output on an HMI system of the automation system, so that the message is visible to a user of the automation system.

The diagnostic model shown can also be employed in a very advantageous manner for tracing the faulty component within the automation system which has caused the alarm message 12. To this end the tree of the diagnostic model, starting from the topmost hierarchy level, is sorted through for faulty components or for model nodes which show an error. In the system shown it is established that the first model node 6 shows an error. Subsequently the model nodes subordinate in the hierarchy to the first model node 6 are investigated for a possible fault and in this process the second model node 7 is identified. Only the third model node 13 is subordinate to the second model node 7, with four further model nodes being subordinate to this in its turn, of which the fourth model node 14 represents the component causing the fault, in this example the I/O module.

To summarize, the invention relates to a method, a computer program product and an engineering system for creating a diagnostic model for an automation system made up of automation components. The diagnostic model will be generated automatically during the project planning phase of the automation system. Within the diagnostic model the automation components are represented by model nodes. Functional and/or physical relationships between the automation components are mapped by links between the corresponding model node within the diagnostic model. Each model node contains status information in which the status of the associated automation component is stored. By evaluating the status information, the status of the automation system can be investigated and monitored with the aid of the diagnostic model.

The invention claimed is:

1. A method of diagnosing an automation system comprising a plurality of automation components having physical or functional relationship, the method comprising:

creating a diagnostic model having a plurality of nodes, wherein a first component and a second component of the plurality of automation components are assigned to a first and a second of the model nodes respectively;

creating a link between the first and second model nodes within the diagnostic model for modeling the physical or functional relationship between the first and second automation components wherein the diagnostic model comprises a hierarchical tree topology of the automation system;

acquiring within the diagnostic model a first status of the first automation component by a first status information regarding the first model node;

acquiring within the first node of the diagnostic model via the link a second status of the second automation component by a second status information regarding the second model node;

evaluating both the first and second status information in the first node of the diagnostic model for determining a status information about the automation system, wherein the diagnostic model is created automatically by an engineering system during a process of project planning of the automation system executed by the engineering system; and detecting a faulty automation component from the plurality of automation components within the automation system by using the diagnostic model, wherein topological links define a hierarchical relationship among the nodes, and a fault indication is advanced in the hierarchical tree topology from a lower level node to a higher level node to present a fault from a lower level node in a top level status information;

wherein the diagnostic model is loaded into the first and/or the second automation component, and activated at run time of the automation system.

2. The method in accordance with claim 1, wherein the first and/or second model nodes comprise an electronic description of the respective automation component.

3. The method in accordance with claim 2, wherein the electronic description comprises a description of possible faults of the respective automation component.

4. The method in accordance with claim 1, further comprising reading the second status information via the link by the first model node.

5. The method in accordance with claim 1, further comprising generating an alarm message based on the first and/or second status information by a filter implemented in the first model node.

6. The method in accordance with claim 1, further comprising indicating a fault by the first status information if the second status information includes information about a fault, wherein the first automation component belongs to a higher functional level compared to the second automation component.

7. The method in accordance with claim 1, further comprising checking the first status information upon occurrence of an alarm message for tracking a cause of a fault triggering the alarm message, wherein the second status information is only checked if the checked first status information indicates the fault.

8. An engineering system for project planning of an automation system having a plurality of automation components, the engineering system comprising:
   a graphical user interface for a user to define a physical and/or functional relationship between a first and a second of the automation components; and
   a processing unit configured to:
      automatically create a diagnostic model during project planning, wherein the first automation component is assigned to a first model node, the second automation component is assigned to a second model node, and the diagnostic model comprises a hierarchical tree topology of the automation system;
      automatically create a link between the first and second model nodes within the diagnosis model based on the user-defined physical and/or functional relationship wherein the diagnostic model is configured to:
         record a first status of the first automation component in a first status information assigned to the first model node;
         record in the first model node via the link a second status of the second automation component in a second status information assigned to the second model node;
         evaluate both the first and second status information within the first model node for determining a status information about the automation system;
         detect a faulty automation component from the plurality of automation components within the automation system by using the diagnostic model,
         wherein topological links define a hierarchical relationship among the nodes, and a fault indication is advanced in the hierarchical tree topology from a lower level node to a higher level node to present a fault from a lower level node in a top level status information that is visible to a user of the automation system; and
      wherein the diagnostic model is loaded into the first and/or the second automation component, and activated at run time of the automation system.

9. The engineering system in accordance with claim 8, wherein the first and/or second model nodes include an electronic description of the respective automation component.

10. The engineering system in accordance with claim 9, wherein the electronic description comprises a description of possible faults of the respective automation component.

11. The engineering system in accordance with claim 8, wherein the processing unit includes a filter implemented in the first model node, the filter configured to generate an message based on the first and/or second status information.

12. The engineering system in accordance with claim 8, wherein the processing unit is configured to indicate a fault by the first status information if the second status information includes information about a fault, wherein the first automation component belongs to a higher functional level compared to the second automation component.

13. The engineering system in accordance with claim 8, wherein the diagnostic model is
   loaded into the first and/or the second automation component, and
   activated at run time of the automation system.

14. A method for project planning of an automation system having a plurality of automation components interconnected in a hierarchy of physical or functional relationships, wherein the automation system includes a first automation component superior to a second automation component superior to a third automation component, the method comprising:
   a user defining a diagnostic model comprising nodes linked in a hierarchical tree topology, wherein each respective node represents, and comprises an electronic description of, an associated component of the automation system, and wherein the hierarchical topology represents physical and/or functional relationships among the automation components;
   executing the model in a processing unit of the first automation component; and
   assigning status information of the associated component to each respective node;
   wherein the third automation component enters a fault indication in a third status information of the third model node, the third status information is then read within the diagnostic model from the second model node, indicating the fault in a second status information of the second model node, the second status information is then read within the diagnostic model from the first model node, indicating the fault in a first status information of the first model node, which then displays an alarm message on the automation system;
   wherein the hierarchical tree topology of the diagnostic model enables the model to determine a fault in a given one of the automation components by filtering status information of a hierarchically higher-level component linked to the given automation component;
   whereby topological links define a hierarchical relationship among the nodes, and a fault indication is advanced in the hierarchical tree topology from a lower level node through an intermediate node to a higher level node to present a fault from a lower level node in a top level status information; and
   wherein the diagnostic model is loaded into the first and/or the second automation component, and activated at run time of the automation system.

15. The method of claim 14, further comprising tracing the fault by sorting status information of any subordinates of the first automation component to locate the fault indication in the second status information, and sorting status information of any subordinates of the second automation component to locate the fault indication in the third status information, wherein the hierarchical tree topology of the diagnostic model provides a location of the fault in the third automation component.

16. The method in accordance with claim 14, wherein the filter function is implemented in the first model node, and the filter function generates an alarm message based on the first status information.

17. The method in accordance with claim 14, wherein the processing unit indicates a fault by the first status information if the second status information includes information about a fault.

18. The method in accordance with claim 14, wherein the defining step comprises a user selecting different components of the automation system from a library of automation components in an engineering system via a graphical user interface, and the user relating the selected components to each other via the graphical user interface, wherein the diagnostic model is then created automatically by the engineering system, and wherein the selected automation components are represented by corresponding model nodes in the hierarchical tree topology.

* * * * *